(12) United States Patent
Zhang et al.

(10) Patent No.: US 12,385,389 B2
(45) Date of Patent: **\*Aug. 12, 2025**

(54) METHODS FOR DIFFERENTIATING AND QUANTIFYING NON-RADIOACTIVE TRACERS DOWNHOLE

(71) Applicant: CARBO CERAMICS INC., Houston, TX (US)

(72) Inventors: Jeremy Zhang, Katy, TX (US); Harry D. Smith, Jr., Spring, TX (US)

(73) Assignee: CARBO CERAMICS INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/751,756

(22) Filed: Jun. 24, 2024

(65) Prior Publication Data

US 2024/0344449 A1 Oct. 17, 2024

Related U.S. Application Data

(63) Continuation of application No. 18/197,570, filed on May 15, 2023, now Pat. No. 12,037,895, which is a continuation of application No. 17/179,087, filed on Feb. 18, 2021, now Pat. No. 11,649,718.

(60) Provisional application No. 62/978,473, filed on Feb. 19, 2020.

(51) Int. Cl.
*E21B 47/11* (2012.01)
*G01V 5/10* (2006.01)

(52) U.S. Cl.
CPC .............. *E21B 47/11* (2020.05); *G01V 5/102* (2013.01)

(58) Field of Classification Search
None
See application file for complete search history.

(56) References Cited

U.S. PATENT DOCUMENTS

| 5,635,712 A | 6/1997 | Scott, III et al. | |
| 9,038,715 B2 * | 5/2015 | Smith, Jr. | ............... E21B 43/04 |
| | | | 166/250.1 |
| 11,649,718 B2 | 5/2023 | Zhang et al. | |
| 12,037,895 B2 * | 7/2024 | Zhang | ..................... E21B 33/13 |

(Continued)

OTHER PUBLICATIONS

International Search Report and Written Opinion dated Apr. 20, 2021 for Application No. PCT/US2021/018566.

*Primary Examiner* — David P Porta
*Assistant Examiner* — Mamadou Faye
(74) *Attorney, Agent, or Firm* — Whitaker Chalk Swindle & Schwartz PLLC; Enrique Sanchez, Jr.; Juan Vasquez

(57) ABSTRACT

The present disclosure is directed to methods for evaluating a gravel pack, a frac-pack, or cement in a wellbore. In at least one embodiment, a method for evaluating a gravel pack, frac-pack or cement in a wellbore, includes pumping a first material into the wellbore, wherein the first material comprises a first tracer that is not radioactive. The method includes pumping a second material into the wellbore, wherein the second material comprises a second tracer that is not radioactive. The method includes obtaining a set of data using the downhole tool in the wellbore after the first and second materials are pumped into the wellbore. The method includes obtaining a baseline using the downhole tool in the wellbore in a depth interval without the first or second material. The method includes comparing the set of data with the baseline.

21 Claims, 3 Drawing Sheets

(56) References Cited

U.S. PATENT DOCUMENTS

| | | |
|---|---|---|
| 2011/0187556 A1 | 8/2011 | Roddy et al. |
| 2012/0080588 A1 | 4/2012 | Smith, Jr. et al. |
| 2016/0024909 A1 | 1/2016 | Han et al. |
| 2016/0292109 A1* | 10/2016 | Schumacher ....... G06F 13/1673 |
| 2017/0292513 A1 | 10/2017 | Haddad et al. |
| 2017/0329041 A1* | 11/2017 | Zhang .................... E21B 43/04 |
| 2018/0087376 A1 | 3/2018 | Rasmus et al. |
| 2019/0170897 A1 | 6/2019 | Zhang et al. |
| 2023/0279772 A1 | 9/2023 | Zhang et al. |

* cited by examiner

METHODS FOR DIFFERENTIATING AND QUANTIFYING NON-RADIOACTIVE TRACERS DOWNHOLE

CROSS-REFERENCE TO RELATED APPLICATIONS

This is a continuation of U.S. Non-Provisional patent application Ser. No. 18/197,570, filed May 15, 2023 which is a continuation of U.S. Non-Provisional patent application Ser. No. 17/179,087, filed Feb. 18, 2021, now U.S. Pat. No. 11,649,718, granted May 16, 2023, which claims the benefit of and priority to U.S. Provisional Patent Application No. 62/978,473 filed Feb. 19, 2020. The above-referenced application is hereby incorporated by reference in its entirety.

TECHNICAL FIELD

The present disclosure is directed to methods for evaluating a gravel pack, a frac-pack, or cement in a wellbore.

BACKGROUND

Recently, non-radioactive tracers or taggants, which include thermal neutron absorbing material containing proppant such as CARBONRT® or NRT®, which is commercially available from CARBO Ceramics Inc., have been implemented in induced fractures, gravel packs, fracture packs, and cement to locate and determine characteristics of the induced fractures, gravel packs, fracture packs, and cement. The non-radioactive tracers may be used to tag proppant, gravel, cement or other material that is pumped into a wellbore during a completion procedure. The tagged material is traditionally evaluated one of two different ways. The first method utilizes detector count rates of the tagged material using a compensated neutron (CNT) logging tool, or utilizes count rates and/or the decay parameters of pulsed neutrons in the formation and borehole region using a pulsed neutron capture (PNC) logging tool, to locate the tagged material in the wellbore region and/or in induced fractures in fracturing, gravel pack, frac-pack, and cementing operations. In general, a log is run before and after the completion procedure, and the data in the two (i.e., before and after) logs is compared. The second method measures capture gamma ray spectroscopy using a PNC logging tool and spectrally resolves the capture gamma rays emanating from the tagged proppant from the capture gamma rays emanating from other downhole elements. These techniques are disclosed in U.S. Pat. Nos. 8,100,177; 8,648,309; 8,805,615; 9,038,715; 10,161,237; U.S. Pre-Grant Publication No. 2019/0170897; and U.S. patent application Ser. No. 16/167,278.

In some methods, a proppant containing a non-radioactive tracer may be placed in one perforation or stage of a frac-pack or gravel pack, and a proppant containing another non-radioactive tracer may be placed in a subsequent frac-pack or gravel pack. In other methods, two different non-radioactive tracers may be deployed simultaneously. For example, one non-radioactive tracer may be used to tag proppant particles of one size, and that non-radioactive tracer-tagged proppant may be mixed, prior to being pumped downhole, with the proppant particles of a different size that are tagged with another, different non-radioactive tracer to provide the frac-pack, gravel-pack, or cement.

These previous systems and methods oftentimes differentiate non-radioactive tracers in completion processes, in part, by obtaining both before and after treatment logs. For example, a user may analyze changes of the capture gamma ray count rate log (or capture-to-inelastic ratio C/I log or inelastic-to-capture ratio I/C log) in an early time window and the count rate log (or C/I log or I/C log) in a later time window, borehole sigma logs, and/or gadolinium (Gd) yield logs to differentiate whether a Gd-tagged proppant or a boron (B)-tagged proppant is present in a near wellbore region. Alternatively, a user may use the change of the capture gamma ray count rate in an optimized time window (where the count rate doesn't change for Gd-tagged proppant but decreases for B-tagged proppant), and combined with the change of Gd yield log to differentiate a Gd-tagged proppant from a mixture of a Gd-tagged proppants and a B-tagged proppant (especially if the percentage of B-tagged proppant is low).

The cost of downtime and wireline services needed to obtain a before pack or before cement log needed to perform these existing detection methods may be cost prohibitive for some users in the field. Therefore, it would be desirable for a user to differentiate two tracer-tagged material and get their filling volumes (or percentages) in a gravel pack or cement region without the need for obtaining a before pack log (or before cement log).

BRIEF SUMMARY

The present disclosure is directed to methods for evaluating a gravel pack, a frac-pack, or cement in a wellbore.

In at least one embodiment, a method for evaluating a gravel pack, frac-pack or cement in a wellbore, includes pumping a first material into the wellbore, wherein the first material comprises a first tracer that is not radioactive. The method includes pumping a second material into the wellbore, wherein the second material comprises a second tracer that is not radioactive, wherein the second tracer is different than the first tracer, and wherein the first and second materials flow into a gravel pack, frac-pack, or cement zone in the wellbore. The method includes obtaining a set of data using the downhole tool in the wellbore after the first and second materials are pumped into the wellbore. The method includes obtaining a baseline using the downhole tool in the wellbore in a depth interval without the first or second material. The method includes comparing the set of data with the baseline.

BRIEF DESCRIPTION OF THE DRAWINGS

The present disclosure may best be understood by referring to the following description and accompanying drawings that are used to illustrate embodiments of the disclosure. In the drawings.

DETAILED DESCRIPTION

Figure 1:
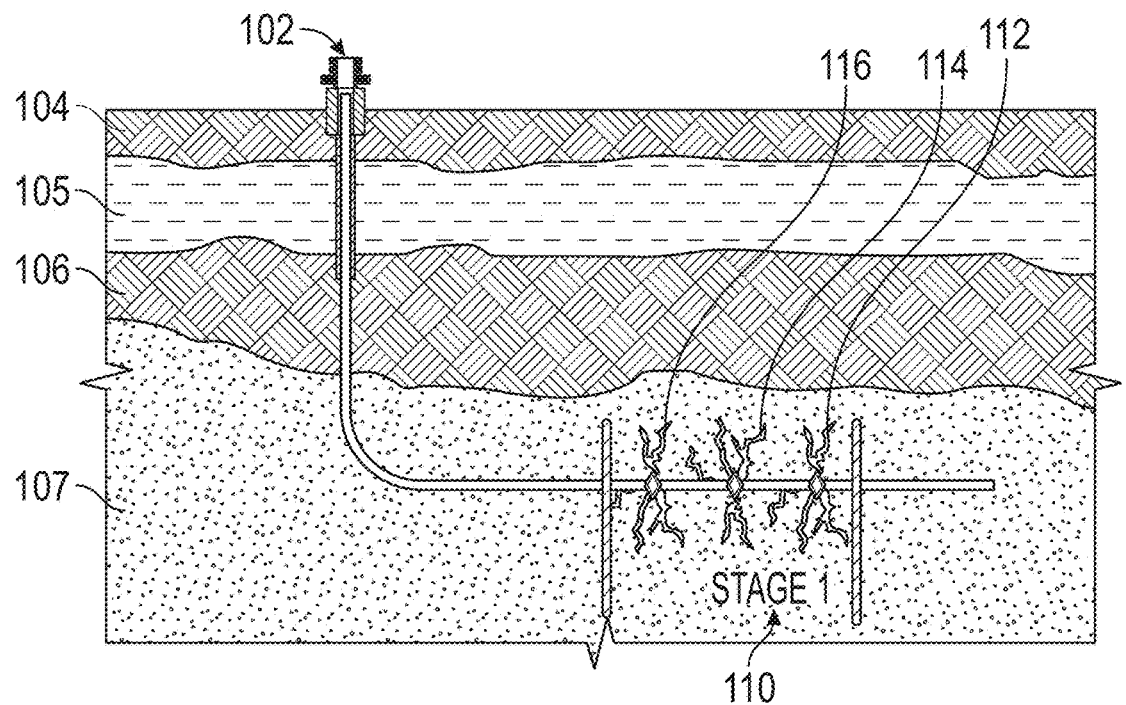
FIG. 1 illustrates a schematic view of a frac-packing treatment in a wellbore, according to an embodiment.

The present disclosure is directed to methods for evaluating a gravel pack, a frac-pack, or cement in a wellbore.

The present disclosure utilizes two (or more) non-radioactive tracers to evaluate downhole gravel packs and/or cement. More particularly, the methods disclosed herein can identify, distinguish and quantify the filling volumes of gravel and/or cement containing non-radioactive tracers without the need for a before pack or before cement log.

Methods for evaluating a gravel pack, a frac-pack, or cement in a wellbore are disclosed. In some embodiments, a method may include pumping a first particulate, such as gravel, into the wellbore. The first particulate may include a first tracer that is not radioactive, or first non-radioactive tracer. The method may also include pumping a second particulate into the wellbore, either simultaneously with or subsequent to, the first particulate. The second particulate may include a second tracer that is not radioactive, or second non-radioactive tracer, that is different from the first non-radioactive tracer. The concentrations of the two tracers in the respective particulates may be selected such that their borehole sigma responses are the same or substantially similar (e.g., the first particulate and second particulate having the same or substantially similar thermal neutron absorption cross-sections). Once pumped, the first and second particulates may flow through the wellbore and be placed into a gravel pack zone of the wellbore. The method may include obtaining a set of data in the wellbore using a downhole tool, such as a pulsed neutron logging tool, after the first and second particulates are placed into the gravel pack zone of the wellbore. The method may include comparing the set of data taken from a depth interval that does not contain any tracer-tagged particulates with a set of data taken from a depth interval containing tracer-tagged particulates (e.g., the first or second particulates) to obtain a total filling volume of the two sets of particulates and the filling volume of each set of particulates in a gravel pack or frac-pack.

A method for evaluating cement in a wellbore is also disclosed. The method may include pumping a first cement slurry into the wellbore. The first cement slurry may include a first tracer that is not radioactive, or first non-radioactive tracer. The method may also include pumping a second cement slurry into the wellbore, either simultaneously with or subsequent to, the first cement slurry. The second cement slurry may include a second tracer that is not radioactive, or second non-radioactive tracer, that is different from the first non-radioactive tracer. The concentrations of the two tracers in the respective cement slurries may be selected such that their borehole sigma responses are the same or substantially similar (e.g., the first slurry and second slurry having the same or substantially similar thermal neutron absorption cross-sections). Once pumped, the first and second slurries may flow through the wellbore and be placed into a cement zone of an annulus of the wellbore. The method may include obtaining a set of data in the wellbore using a downhole tool, such as a pulsed neutron logging tool, after the first and second slurries are placed into the annulus of the wellbore. The method may include comparing the set of data taken from a depth interval that does not contain any tracer-tagged cement with a set of data taken from a depth interval containing tracer-tagged cement (e.g., the first or second slurries) to obtain a total filling volume of the two sets of cement slurries and the filling volume of each set of cement slurry in the annulus of the wellbore.

The present disclosure is directed to methods for using data captured by a downhole tool (e.g., a pulsed neutron capture (PNC) tool) after a gravel packing, frac-packing, or cementing treatment. In particular, the present disclosure is directed to detecting and characterizing frac-packs, gravel packs, or cement by using data captured by a single deployment, or run, of a PNC tool after a gravel packing, frac-packing, or cementing treatment containing one or more types of non-radioactive-tagged material(s).

As used herein, the term "non-radioactive-tagged material" refers to a material that is tagged by a tracer that is not radioactive. The material may be or include solids that are oftentimes deployed into a well bore or subterranean formation. The solids may include proppant or gravel, such as sand, ceramic proppant, or other ceramic material. In one or more embodiments, the solids may be formed from clays including, but not limited to, kaolin, bauxite and the like. The solids may include silica and/or alumina in any suitable amounts. In one or more embodiments, the solids may include less than or equal to 100 wt %, less than 80 wt %, less than 60 wt %, less than 40 wt %, less than 30 wt %, less than 20 wt %, less than 10 wt %, or less than 5 wt % silica based on the total weight of the solids. According to several embodiments, the solids may include at least about 30 wt %, at least about 50 wt %, at least about 60 wt %, at least about 70 wt %, at least about 80 wt %, at least about 90 wt %, or at least about 95 wt % alumina based on the total weight of the solids. In one or more exemplary embodiments, the solids may be or include sand.

In one or more embodiments, the solids disclosed herein may include proppant particles that are substantially round and spherical having a size in a range between about 6 and 270 U.S. Mesh, between about 20 and 40 U.S. Mesh, between about 30 and 50 U.S. Mesh, or between about 40 and 70 U.S. Mesh. In one or more embodiments, the proppant particles disclosed herein may be or include conventional ceramic proppant. Such conventional ceramic proppant may be manufactured according to any suitable process including, but not limited to continuous spray atomization, spray fluidization, spray drying, or compression. Suitable conventional ceramic proppants and methods for their manufacture are disclosed in U.S. Pat. Nos. 4,068,718, 4,427,068, 4,440,866, 4,522,731, 4,623,630, 4,658,899, 5,188,175, 8,865,693, 8,883,693 and 9,175,210, the entire disclosures of which are incorporated herein by reference. The ceramic proppants may also be manufactured in a manner that creates porosity in the proppant grain. A process to manufacture a suitable porous ceramic proppant is described in U.S. Pat. No. 7,036,591, the entire disclosure of which is incorporated herein by reference.

The solids disclosed herein may also include cement. The term "cement," as used herein, may refer to any suitable hydraulic cement. The hydraulic cement may be or include any suitable matter, such as calcium, aluminum, silicon, oxygen, and/or sulfur, which sets and hardens by reaction with water. Such hydraulic cements include, but are not limited to, Portland cements, pozzolanic cements, gypsum cements, high alumina content cements, silica cements, combinations thereof, and the like. In one or more embodiments, the cement material may be from a clay including, but not limited to, kaolin, bauxite and the like.

In one or more embodiments, the cement may be mixed with water to form a cement slurry for placement in a wellbore or annulus. In one or more embodiments, the cement slurry may contain water and cement in any suitable amounts. The cement slurry may have a cement concentration of about 1 wt % to about 20 wt %.

In one or more embodiments, the cement may be mixed with water and gravel pack particles and/or proppant particles to form a cement slurry for placement in a wellbore or annulus. In one or more exemplary embodiments, the cement slurry may contain water, cement and proppant particles in any suitable amounts. The cement slurry may have a cement concentration of about 1 wt % to about 20 wt % and a proppant concentration of about 5 wt % to about 70 wt %.

The tracer may be incorporated into, infused into, coated onto or otherwise combined with the material or solids to be deployed downhole to provide the non-radioactive-tagged material. The tracer may be a thermal neutron absorbing material. The thermal neutron absorbing material may be boron, cadmium, gadolinium, samarium, iridium, or mixtures thereof. Suitable boron containing high capture cross-section materials include boron carbide, boron nitride, boric acid, high boron concentrate glass, zinc borate, borax, and combinations thereof.

The methods disclosed herein may include first and second thermal neutron absorbing materials. The tracer in a first non-radioactive-tagged material may be different from the tracer in the second non-radioactive-tagged material. The tracer in the first non-radioactive-tagged material may be or include, for example, gadolinium (Gd) or samarium (Sm). For example, the first tracer may be or include $Gd_2O_3$ or $Sm_2O_3$. After the first gravel packing or frac-packing procedure is completed, a second gravel packing or frac-packing procedure may be initiated. The second gravel packing or frac-packing procedure may include pumping a second non-radioactive-tagged material into the wellbore 102. In one embodiment, the first gravel packing or frac-packing procedure may contain tagged proppant particles of one size (mesh), and the following treatment may contain tagged proppant particles of a different size (mesh). The tracer in the second non-radioactive-tagged material may be different from the first non-radioactive-tagged material. The tracer in the second non-radioactive-tagged material may be or include, for example, boron (B). For example, the tracer may be or include $B_4C$. The two non-radioactively tagged materials may also be employed in a single gravel packing or frac-packing procedure where an initial portion of the treatment contained one tag material and a second portion contains the second tag material.

In a first scenario, a single non-radioactive-tagged material is present. In the second scenario, a combination/mixture of a first non-radioactive-tagged material and a second non-radioactive-tagged material is present. The first and second non-radioactive-tagged material may be or include non-radioactive-tagged gravel or proppant particles. In one or more embodiments, the first and second non-radioactive-tagged material may be or include non-radioactive-tagged cementitious particulates, such as ceramic proppant blended with one or more cement slurries. The methods of the present disclosure may be used to identify, distinguish and quantify the filling volumes of the non-radioactive tracer-tagged material in both the first and second scenarios without a before pack or before cement log.

In an embodiment, the first non-radioactive-tagged material and the second non-radioactive-tagged material may be selected to have the same or substantially similar response on a borehole sigma log. In relation to a reference numerical value, including a reference percentage value, and its grammatical equivalents the term "substantially similar" as used herein means the numerical value (or percentage value) itself and a range of values plus or minus 10% from that numerical value (or percentage value). In such embodiments, an increase of a borehole sigma observed relative to a baseline reading may be used to obtain a total filling volume of the two tracer-tagged materials in a gravel pack, frac-pack, or cement zone of an annulus, where the maximum increase of borehole sigma at a depth would correspond to the 100% filling volume of the combined first and second non-radioactive-tagged materials.

The baseline reading may be obtained in an interval where no non-radioactive-tagged material is present (usually the lowest borehole sigma along the blank pipe or frac-pack assembly). The filling volume of Gd-tagged material is obtained from the increase of Gd yield log relative to the baseline reading. In an embodiment, the maximum observed increase of the Gd yield at a depth corresponds to the 100% filling volume of Gd-tagged material. The baseline of Gd yield may also be chosen in an interval where no non-radioactive-tagged material is present (usually a reading along the blank pipe or frac-pack assembly). The difference of the total filling volume of the combined first and second non-radioactive-tagged materials and the filling volume of Gd-tagged material may be computed to be the filling volume of B-tagged material in the gravel pack, frac-pack, or cement zone. If a reading at a depth interval indicates both the Gd-tagged material filling volume and the B-tagged material filling volume are close to zero, then there is likely no tagged material in such gravel pack, frack-pack, or cement zone. In a depth interval where only one of the Gd-tagged material filling volume or the B-tagged material filling volume is close to zero, then only one tracer-tagged material is in the gravel pack, frack-pack, or cement zone. In a depth interval where both the Gd-tagged proppant filling volume and the B-tagged proppant filling volume are not close to zero, then both tracer-tagged materials are present in the gravel pack, frack-pack, or cement zone.

FIG. 1 illustrates a schematic view of a wellsite 100 including a frac-packing treatment in a wellbore 102, according to an embodiment. The wellbore 102 may extend into a subterranean formation having one or more layers. In the example shown in FIG. 1, the wellbore 102 may include a substantially vertical portion that extends downward through a first formation layer 104, a second formation layer 105, a third formation layer 106, and a reservoir layer 107. The wellbore 102 may also include a substantially horizontal portion (e.g., in the reservoir layer 107).

The wellbore 102 may be cased or uncased. The wellbore 102 may also be perforated and/or frac-packed in one or more stages. In the example shown in FIG. 1, the horizontal portion of the wellbore 102 may be perforated and/or frac-packed in a first stage 110. The first stage 110 may include one or more sets of perforations (three are shown: 112, 114, 116). The perforations 112, 114, 116 may be axially-offset from one another with respect to a central longitudinal axis through the wellbore 102. For example, the first set of perforations 112 may be positioned below (e.g., farther from the origination point of the wellbore 102 than) the second set of perforations 114, and the second set of perforations 114 may be positioned below the third set of perforations 116. The first set of perforations 112 may be generated before or at the same time as the second set of perforations 114, and the second set of perforations 114 may be generated before or at the same time as the third set of perforations 116.

After the perforations 112, 114, 116 are formed, one or more frac-packing procedures may be initiated. The frac-packing procedures may each include pumping a proppant tagged with a non-radioactive tracer into the wellbore 102. These proppants may be referred to as non-radioactive-tagged proppants, which include a tracer material that is not radioactive and has a high thermal neutron capture cross-section.

In at least one embodiment, the frac-pack procedures may be initiated/performed sequentially. For example, a first non-radioactive-tagged proppant may be placed in one perforation 112 and/or nearby gravel pack region of a frac-pack, and another, second non-radioactive-tagged proppant may be placed in a subsequent perforation 114 and/or nearby gravel pack region. In another embodiment, the frac-pack procedures may be initiated/performed simultaneously. For example, a first non-radioactive material, or first thermal absorbing material, may be used to tag proppant particles of one size, and that first non-radioactive-tagged proppant may be mixed, prior to being pumped downhole, with the proppant particles of a different size that are tagged with a second non-radioactive material, or second thermal absorbing material.

Figure 2:
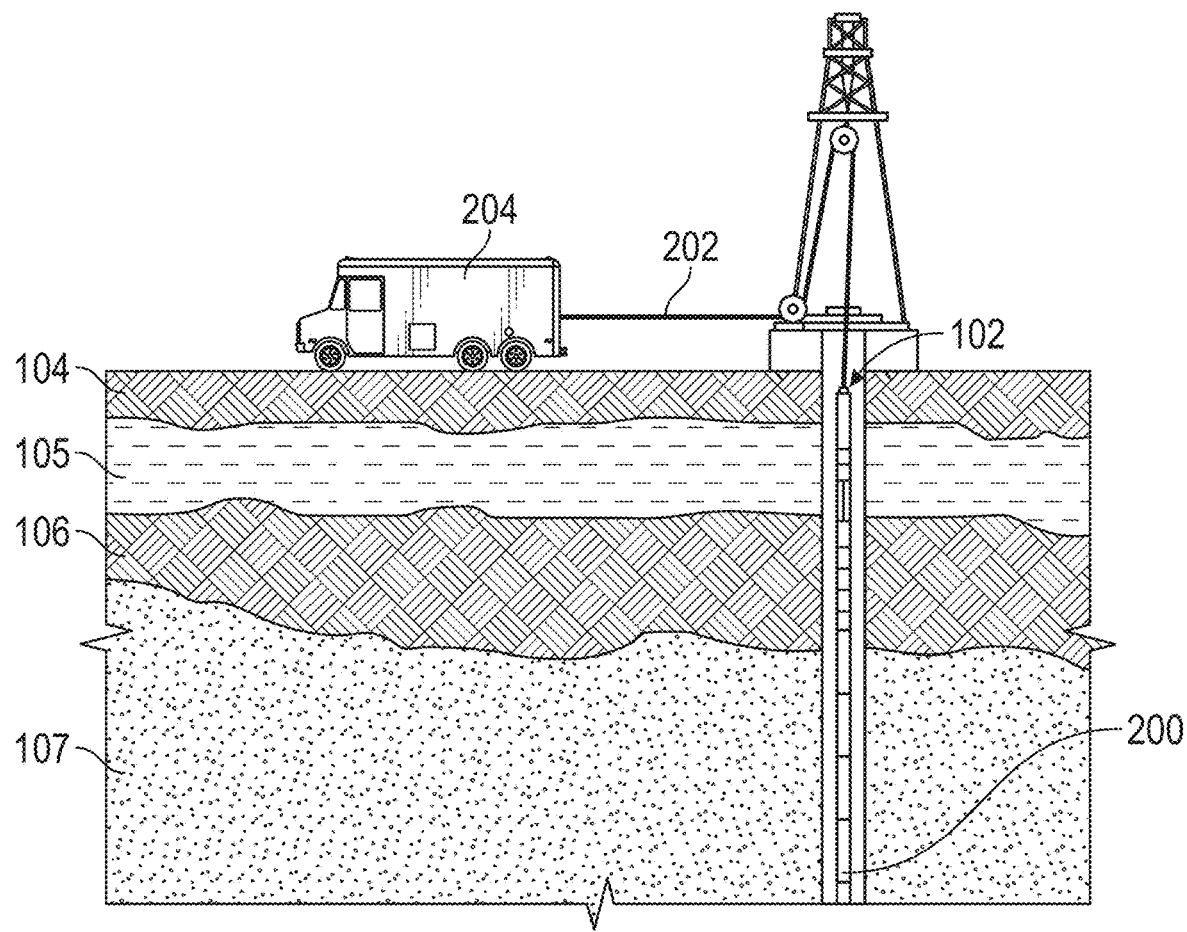
FIG. 2 illustrates a schematic view of a downhole pulsed neutron tool in the wellbore, according to an embodiment.

FIG. 2 illustrates a schematic view of a downhole tool 200 in the wellbore 102, according to an embodiment. In at least one embodiment, the downhole tool 200 may include a pulsed neutron capture (PNC) tool containing a pulsed neutron source. The downhole tool 200 may be run into the wellbore 102 in a single pass to obtain measurements after the frac-packing procedures, the measurements being obtained while the downhole tool 200 is being pulled out the wellbore 102. In an embodiment, all of the measurements made by the downhole tool 200 may be obtained with a single run or deployment of the downhole tool 200 in the wellbore 102.

As shown, the downhole tool 200 may be lowered and then raised in the wellbore 102 via a wireline 202. In other embodiments, the downhole tool 200 may instead be lowered and raised by a drill string or coiled tubing. The data obtained by the downhole tool 200 may be transmitted to, stored in, and/or analyzed by a computing system 204. The computing system 204 may include one or more processors and a memory system. The memory system may include one or more non-transitory computer-readable media storing instructions that, when executed by at least one of the one or more processors, cause the computing system to perform operations. The operations are described below, for example, in FIG. 4. The data obtained by the downhole tool 200 may be stored inside or outside the tool by a memory device and the data may be downloaded and processed later when the tool get to the surface.

Figure 3:
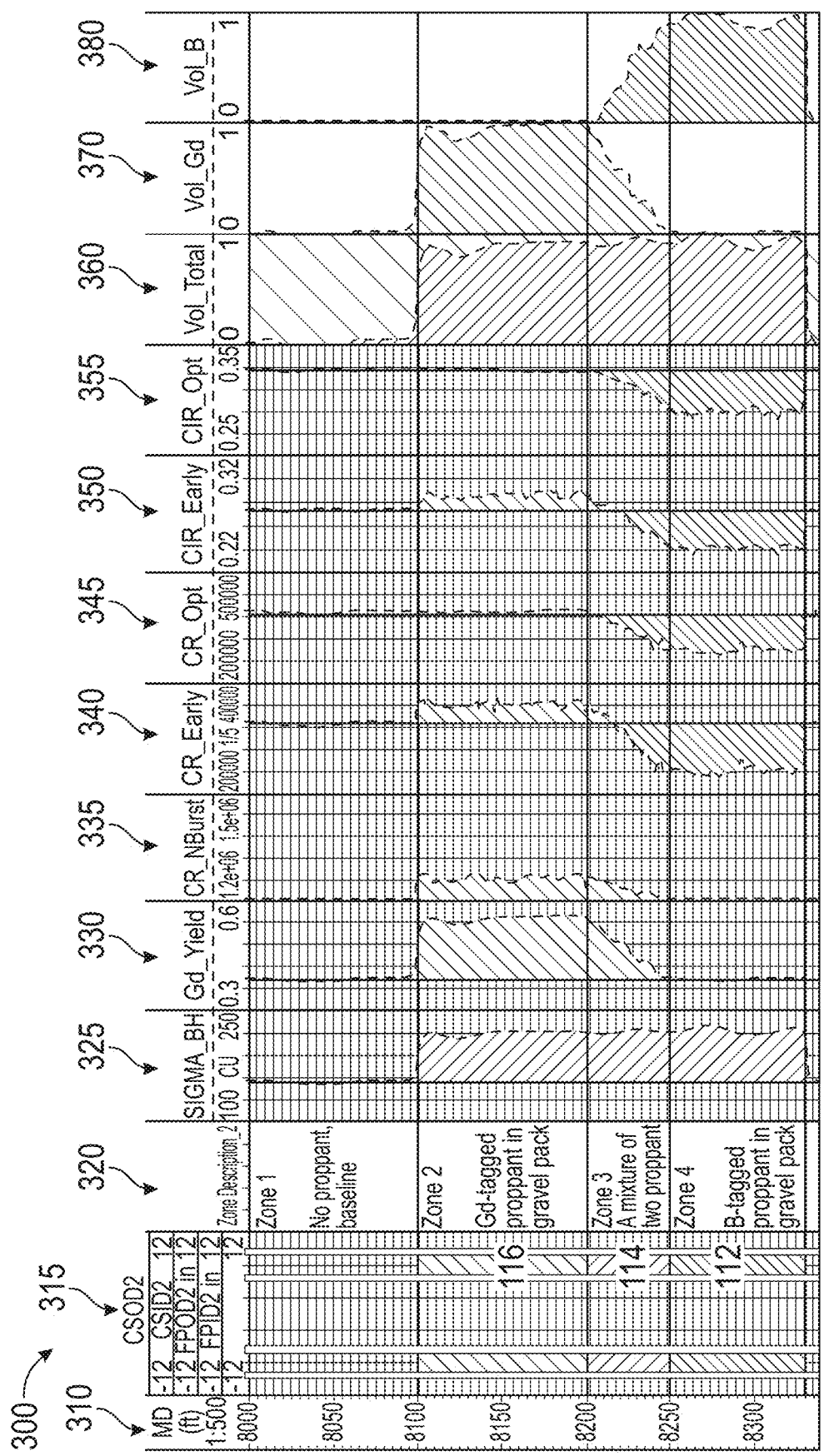
FIG. 3 illustrates a log showing data obtained by the downhole in the wellbore after a stage is fractured and packed with a boron-tagged proppant, a mixture of boron-tagged and gadolinium-tagged proppant and a gadolinium-tagged proppant, from the bottom to the top, according to an embodiment.

FIG. 3 illustrates a log 300 showing data obtained by the downhole (e.g., PNC) tool 200 in the wellbore 102 after the stage 110 is frac-packed with a boron-tagged proppant and a gadolinium-tagged proppant, according to an embodiment. The log 300 has log columns showing the depths where measurements were recorded/captured 310, frac-pack assembly and gravel pack 315, the zonation 320, the borehole sigma 325, the taggant/tracer element (e.g., Gd) yield 330. The log 300 also has columns showing various time windows, in particular, the detector gamma ray count rate in a time window during neutron bursts 335 (e.g., 0 μs to 30 μs from the initiation of the 30 μs wide neutron burst), the detector capture gamma ray count rate in an early time window 340 (e.g., 40 μs to 70 μs from the initiation of the 30 μs wide neutron burst), the detector capture gamma ray count rate in a predetermined time window 345 (e.g., optimized time window, 40 μs to 130 μs from the initiation of the 30 μs wide neutron burst), the ratio of the detector capture gamma ray count rate in an early time window 350 (e.g., 30 μs to 70 μs from the initiation of the 30 μs wide neutron burst) to the gamma ray count rate in a time window during neutron bursts, the ratio of the detector capture gamma ray count rate in a predetermined time window (e.g., optimized time window, 30 μs to 130 μs from the initiation of the 30 μs wide neutron burst) to the gamma ray count rate in a time window during the neutron bursts 355. In addition, the log 300 also has columns showing the total filling volume of the first tracer-tagged proppant (e.g., B-tagged proppant) and the second tracer-tagged proppant (e.g., Gd-tagged proppant) 360, the filling volume of first tracer-tagged proppant (e.g., B-tagged proppant) 370, and the filling volume of second tracer-tagged proppant (e.g., B-tagged proppant) 380. The solid lines represent the baselines of data captured (i.e., logs in an interval without gravel pack, usually a section of depth interval of the blank pipe or frac-pack assembly) and the dashed lines represent the data captured after frac-packing (i.e., the after logs).

As shown in FIG. 3, the B-tagged proppant alone is contained in a gravel pack near the first set of perforations 112, a mixture of the Gd-tagged proppant and the B-tagged proppant is contained in a gravel pack near the second set of perforations 114, and the Gd-tagged proppant alone is contained in a gravel pack near the third set of perforations 116. The after-pack borehole sigma log increases due to the presence of tracer-tagged proppant in the gravel pack region, independent of which tracer-tagged proppant is or is not in the region. Since the two tracer-tagged proppants (e.g., B-tagged proppant and Gd-tagged proppant) have exactly same thermal neutron absorption cross-section, and therefore the same response on the borehole sigma, the total filling volume of the two tracer-tagged proppants in a gravel pack is discernable. The Gd yield log, however, only increases due to the presence of the Gd-tagged proppant. As a result, the Gd-yield log may be utilized to obtain the filling volume of the Gd-tagged proppant in the gravel pack, either as a pure Gd-tagged proppant or included as a mixture of the two tracer-tagged proppants in the gravel pack. The filling volume of B-tagged proppant in the gravel pack may be obtained by calculating the difference of the total filling volume of two tracer-tagged proppants and the filling volume of Gd-tagged proppant.

It has also been found that the after-pack gamma ray count rate in the time window during the neutron burst 335 does not change for B-tagged proppant but increases for Gd-tagged proppant in a gravel pack, frac-pack, or cement annulus. A reason for this result is that when interacting with neutrons, Gd initiates high energy gamma rays, which may be detected by a detector but the energy of gamma rays generated from B is too low to be detected, due to the shielding or package of a detector. This is why the detector capture gamma ray count rate in the early time window 340 increases for the Gd-tagged proppant but decreases for the B-tagged proppant.

The detector capture gamma ray count rate in a predetermined optimized time window 345 does not change for Gd-tagged proppant but decreases for the B-tagged proppant. This time window was selected such that the count rate increases in the early part of the time window are offset by the count rate decreases in the later portion of the time window (e.g., 40-130 µs window) for Gd-tagged proppant. This is not the case for B tagged proppant, since the capture gamma ray count rates in all capture gamma time windows decrease when B-tagged proppant is present. Similar responses are observed on the ratio of the detector capture gamma ray count rate in an early time window to the gamma ray count rate in a time window during the neutron burst 350 and the ratio of the detector capture gamma ray count rate in the predetermined optimized time window to the gamma ray count rate in a time window during neutron burst 355. The reason is that compared to the changes in the capture gamma rays after the neutron bursts, the changes in the gamma rays during the neutron bursts are much smaller. The use of the ratio of gamma ray count rates in two different time windows may cancel out the effect on count rate comparison due to variations of neutron generator's output. Although different time windows (40-130 µs vs. 30-130 µs) may be used for the captured gamma ray count rates and the ratios to offset the small change of gamma ray count rate during neutron bursts due to Gd-tagged proppant, one may also use a narrower neutron burst or a narrower early time window (e.g., 0-10 µs) to reduce the change of gamma ray count rate during the neutron bursts on the ratio calculation. These logs (340-355) may be used as supplements in the gravel pack evaluation. For example, the change in the gamma rays during the neutron bursts may be utilized to obtain the filling volume of Gd-tagged proppant. Also, the change of the capture gamma ray count rate in a predetermined optimized time window, or the change of the ratio of the capture gamma ray count rate in a predetermined optimized time window to the gamma ray count rate in a time window during neutron burst, may be used to independently obtain the filling volume of B-tagged proppant. The filling volume of the other tracer-tagged proppant may then be obtained by subtracting the volume of one tracer-tagged proppant from the total filling volume of the two tracer-tagged proppants.

Conventional systems and methods cannot quantify the volumes in a mixture of the Gd-tagged proppant and the B-tagged proppant in gravel pack without a before-pack log, as the responses of two tracer-tagged proppants (Gd and B) on the borehole sigma are different. Accordingly, the systems and methods disclosed herein (possibly including the use of baseline log measurements in logged intervals where tagged proppant is not present) may enable a user to differentiate and quantify the Gd-tagged proppant and the B-tagged proppant in a gravel pack without the need for any before-pack log, regardless of whether just one of tracer-tagged proppants fills the gravel pack, or a mixture of the two tracer-tagged proppants fill the gravel pack.

Tables 1 and 2 illustrate MCNP modeling of the changes of borehole sigma, formation sigma, gamma rays in a time window during the neutron burst and the ratios of capture gamma ray count rates in different time windows to the gamma ray count rate in a time window during the neutron bursts, relative to the beginning of a 30 µs wide neutron source pulse, due to a gravel pack in Table 1 and a frac-pack (the same gravel pack plus 1.0 cm wide proppant filled in formation fracture) in Table 2. Data are shown for 0.2% Gd-tagged proppant, 1.0% B-tagged proppant and and a 1:1 mixture rate of the two tracer-tagged proppants for a typical 8.5-in cased well as an example.

TABLE 1

Gravel Pack

| Tracer | Concentration | Sigma of proppant c.u. | d ($\Sigma$bh) | d ($\Sigma$fm) | d(I) 0-30 µs | d(C/I) 30-70 µs | d(C/I) 70-200 µs | d(C/I) 30-130 µs |
|---|---|---|---|---|---|---|---|---|
| $Gd_2O_3$ | 0.2% | $1.21 \times 10^3$ | 26.4% | 0.5% | 6.3% | 7.7% | −18.4% | −1.3% |
| B4C | 1.0% | $1.24 \times 10^3$ | 23.0% | −0.3% | 0.50% | −18.6% | −36.3% | −24.6% |
| Mixture | | $1.23 \times 10^3$ | 23.4% | −0.1% | 2.8% | −8.2% | −28.7% | −15.2% |

TABLE 2

Gravel Pack and Fracture (Frac-Pack)

| Tracer | Concentration | Sigma of proppant c.u. | d ($\Sigma$bh) | d ($\Sigma$fm) | d(I) 0-30 µs | d(C/I) 30-70 µs | d(C/I) 70-200 µs | d(C/I) 30-130 µs |
|---|---|---|---|---|---|---|---|---|
| $Gd_2O_3$ | 0.2% | $1.21 \times 10^3$ | 24.9% | 11.4% | 6.65% | 9.9% | −16.7% | 0.9% |
| B4C | 1.0% | $1.24 \times 10^3$ | 22.1% | 7.8% | 0.52% | −19.1% | −39.1% | −25.5% |
| Mixture | | $1.23 \times 10^3$ | 22.6% | 9.7% | 2.95% | −7.6% | −29.7% | −14.9% |

The results show that the presence of either 0.2% Gd-tagged proppant or 1.0% B-tagged proppant or the mixture of two tracer-tagged proppant in the 1.0-cm fracture has little effect on the gravel pack evaluation using either borehole sigma, count rate in the time window during neutron bursts (I), or the ratios (C/I) of count rates in different time windows to the count rate in the time window during the neutron bursts, as these data listed in the two table are pretty close. That is to say, the tracer-tagged proppant in fracture only affects the formation sigma measurement or detector count rate in later time window (after 200 µs from the start of neutron pulses).

By tailoring the two tracer concentrations in the proppants (e.g., 0.2% $Gd_2O_3$ and 1.0% $B_4C$), one may make the resulting thermal neutron absorption cross-sections substantially similar for the two tracer-tagged proppants. As a result, their effects on the borehole sigma are substantially similar as well. Therefore, one may use the after-pack borehole sigma log to calculate the total proppant filling volume in the gravel pack, regardless of whether it contains either one of two tracer-tagged proppants, or a mixture of two tracer-tagged proppants.

The baseline of a log is chosen in a depth interval where no proppant fills in the pack annulus and where the thickness of the blank pipe or frac-pack assembly is close to the thickness of the screen. The interval of the baseline may be identified by the lowest section on borehole sigma log, usually a section of the blank pipe or the frac-pack assembly.

The filling volume of Gd-tagged proppant is obtained by the increase of Gd yield log relative to the baseline, where the maximum increase of the Gd yield at the depth would be corresponding to the 100% filling volume of Gd-tagged proppant.

The difference of the total filling volume of two tracer-tagged proppants and the filling volume of Gd-tagged proppant is the filling volume of B-tagged proppant in the gravel pack.

The gamma ray count rate in a time window during the neutron bursts may also be used as an independent indicator of the Gd-tagged proppant in gravel pack, as the gamma rays count rate in the time window increases for the Gd-tagged proppant but does not change for the B-tagged proppant in the gravel pack, as described above.

The ratio of the detector capture gamma ray count rate in an optimized time window (e.g., 30 µs to 130 µs) to the gamma ray count rate in a time window during neutron bursts (e.g., 0 µs to 30 µs) may be used as an independent indicator of the B-tagged proppant in gravel pack, as one may choose the optimized time window so that the ratio doesn't change for the Gd-tagged proppant but decreases for the B-tagged proppant in the gravel pack.

The ratio of the detector capture gamma ray count rate in the early time window (e.g., 30-70 µs) to the gamma ray count rate in a time window during neutron bursts (e.g., 0-30 µs) may also be used in the identification of the two tracer-tagged proppant, as it decreases for the B-tagged proppant but increases for the Gd-tagged proppant in the gravel pack.

Although the use of ratios of gamma ray count rates in different time windows (e.g., a time window during neutron burst, an early time window and an optimized time window) to identify and quantify the filling volume of different tracer-tagged proppant is shown, it is understood one may also use the count rates in different time windows to identify and quantify such filling volumes. In those cases, time windows may be selected that are different from those used in the C/I ratios (e.g., one may use 40-130 µs as the optimized time window for the capture gamma ray count rate (C), instead of 30-130 µs as the optimized time window for the captured gamma ray count rate in the C/I ratio). An advantage of using the ratios of count rates in different time windows is that ratios may remove the effects of variations in neutron generator output on a count rate based evaluation.

Although a time window of 0 µs to 30 µs is used during the neutron bursts in the above ratio calculations, one may also use a narrower time window during the early part neutron burst (e.g., 0-10 µs) for the burst window.

Also, one may also use $Sm_2O_3$ in place of $Gd_2O_3$ in the methods described herein as Sm and Gd have similar gamma ray energy spectra when thermal neutrons are absorbed. If $Sm_2O_3$ is selected as a taggant, one would only need to adjust the concentration of $Sm_2O_3$ in the proppant or other material so that the thermal neutron absorption cross-section of the proppant or other material is the same as or substantially similar to that of the $B_4C$-tagged proppant/material. In this way, one may get the substantially similar borehole sigma responses for the two tracer-tagged proppant (Sm-tagged proppant vs. B-tagged proppant).

Figure 4:
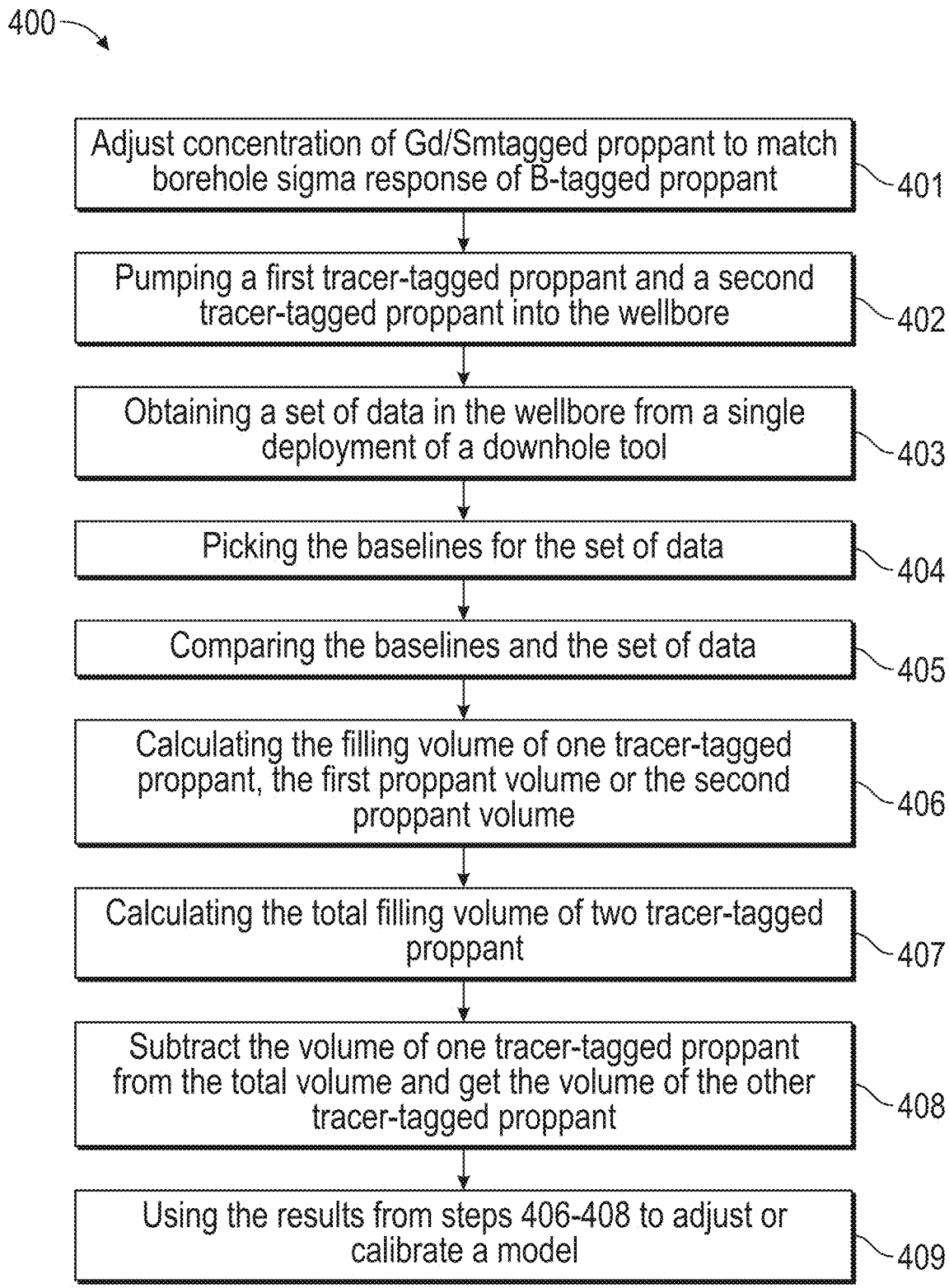
FIG. 4 illustrates a flowchart of a method for evaluating multiple frac-packs or gravel-packs in the wellbore using data obtained by the downhole tool, according to an embodiment.

FIG. 4 illustrates a flowchart of a method 400 for evaluating multiple tracer-tagged proppant in gravel pack in the wellbore 102 using data obtained by the downhole tool 200, according to an embodiment. The method 400 may include an initial step of adjusting the concentration of a Gd or Sm tagged proppant to obtain a borehole sigma response the same as or substantially similar to a borehole sigma response of a B-tagged proppant, as at 401.

The method 400 may also include pumping a first tracer-tagged proppant (e.g., the Gd-tagged proppant) and a second tracer-tagged proppant (e.g., the B-tagged proppant) into the wellbore 102, either sequentially or simultaneously, as at 402. As described above, the tracer-tagged proppants may be pumped as part of a gravel pack procedure, a frac-pack procedure, and/or a cementing procedure. For example, both the first tracer-tagged proppant (e.g., the Gd-tagged proppant) and the second tracer-tagged proppant (e.g., the B-tagged proppant) may be pumped into the same set of perforations to become part of an adjacent gravel pack. Thus, this method 400 may be used to detect where each tracer-tagged proppant is present in the gravel pack region.

The method 400 may include obtaining (e.g., logging) a set of data in the wellbore 102 using a downhole pulsed neutron tool 200 (e.g., after the tracer-tagged proppants are pumped), as at 403. The set of data may include borehole sigma, formation sigma, taggant/tracer element yield (e.g., Gd yield), detector capture gamma ray count rates in different time windows (e.g., a time window during neutron bursts, an early time window, a late time window, and/or an optimized time window), ratios of detector count rates in different time windows, or a combination thereof. The data may be obtained with a single run or deployment of the downhole tool 200 through the wellbore. For example, the data may be obtained without any measurement before the pumping of the first and/or second tracer-tagged proppant as at 402.

The method 400 may also include choosing the baseline for the set of data, as at 404. As described above, the baseline may be identified by the lowest section on borehole sigma log, usually a section of the blank pipe or the frac-pack assembly. Normalizing and/or correcting the set of data may account for possible changes inside the wellbore 102 or casing or formation differences so that the base lines and the set of data are compared in same well conditions except whether the gravel pack is present or not.

The method 400 may also include comparing the baselines with the set of data, as at 405. The comparison may occur after the normalization and correction. The comparison may include, but is not limited to, comparing the natural gamma ray, borehole sigma, formation sigma, taggant/tracer element yield (e.g., Gd yield), detector count rate in the time window during neutron bursts, capture gamma ray count rates in different time windows (e.g., an early time window, an late time window, and/or an optimized time window), ratios of detector count rates in different time windows, or a combination thereof.

For example, the comparison may include comparing the borehole sigma log with its baseline in the set of data to obtain the total proppant filling volume of two tracer-tagged proppants in the gravel pack. The comparison may include comparing the Gd-yield log with its baseline in the set of data to obtain the filling volume of Gd-tagged proppant in the gravel pack. In another example, the comparison may include comparing the gamma ray count rate in a time window during the neutron bursts with its baseline to obtain the filling volume of Gd-tagged proppant in the gravel pack. In another example, the comparison may include comparing the ratio of the detector capture gamma ray count rate in the optimized time window to the gamma ray count rate in a time window during the neutron bursts, to its baseline to obtain the B-tagged proppant volume in the gravel pack. In yet another example, the comparison may include comparing the ratio of the detector capture gamma ray count rate in an early time window to the gamma ray count rate in a time window during neutron bursts, to its baseline to obtain the B-tagged proppant volume and Gd-tagged proppant volume in the gravel pack.

The method 400 may also include determining which tracer-tagged proppants are present in gravel pack near one or more (e.g., each) of the sets of perforations 112, 114, 116 based at least partially upon the comparison, as at 406-408. As an example, this may also include determining whether fracture induced by the first set perforations 112 includes a first tracer-tagged proppant (e.g., B-tagged proppant) or the fracture induced by the second set of perforations 114 includes a mixture of the first tracer-tagged proppant (e.g., Gd-tagged proppant) and the second tracer-tagged proppant (e.g., B-tagged proppant), or the fracture induced by the third set of perforations 116 includes a second-tracer-tagged proppant, when one tracer-tagged proppant or a mixture of two tracer-tagged proppants is near one set of perforations.

When both of the two tracer-tagged proppants are detected in the gravel pack (e.g., near the second set of perforations 114), the method 400 may also include determining the filling volume of the first tracer-tagged proppant, the filling volume of the second tracer-tagged proppant, and the total filling volume of two tracer-tagged proppants in the gravel pack, as at 406-408. The volumes may be based at least partially upon an amount that the borehole sigma increases and an amount that the tracer yield log 330 increases or changes of gamma ray count rates in different time windows or changes of ratios of gamma ray count rates in different time windows, compared to their baselines, due to the tracer-tagged proppants in the gravel pack, proximate to the set of perforations 114.

The method 400 may also include calibrating a model in response to the comparison and/or the determination, as at 409. The model may include a fracture model, a frac-pack model, a gravel pack model, or a cement model. The model may be calibrated to reduce any uncertainties in fracturing, frac-packing, gravel packing, and/or cementing design. This may lead to more efficient fracturing, frac-packing, gravel packing, and cementing procedures and improve the ultimate oil or gas recovery resulting from such procedures. Also, different non-radioactive tracers may be used in different stages of a fracturing, frac-packing, gravel packing, or cementing procedure, and the results obtained may be used to optimize future fracturing, frac-packing, gravel packing, or cementing procedures.

In another embodiment, the particles size(s) in the proppant(s) may be varied or mixed with other proppant (e.g., sand) and placed downhole either sequentially or simultaneously, with the different proppant size particles tagged with different non-radioactive tracers, again with the results utilized to optimize future fracturing, frac-packing or gravel packing operations.

Although the present disclosure is directed to using a single log obtained after the treatment (e.g., the after frac-pack log) to do the evaluation, it is understood that in situations where a before treatment log (e.g., a before frac-pack log) is available, one may use the before log to replace or supplement the baseline. The evaluation results using the before log may then be compared or combined with an evaluation in a comparable wellbore (such as an offset well or other well in a similar formation) that does not include a before log to increase the accuracy and precision of such evaluation.

Although much of the foregoing disclosed herein has been focused on evaluating gravel pack and frac-pack procedures, the same principles or procedures may be used to determine locations of two tracer-tagged cements (e.g., Gd-tagged cement and B-tagged cement) in cementing applications, since cement, like a gravel pack, is placed in the borehole region (generally either between the casing and the borehole wall or the annulus between casing strings). For example, the methods disclosed herein may be used to determine the locations of the tracer-tagged cements (e.g., one tracer is used in the lead-in cement and the other tracer is used in the tail-in cement, or one tracer is used in different depth intervals, or different tracers are used in different depth intervals during cementing).

It is understood that modifications to the disclosure may be made as might occur to one skilled in the field of the disclosure within the scope of the appended claims. All embodiments contemplated hereunder which achieve the objects of the disclosure have not been shown in complete detail. Other embodiments may be developed without departing from the spirit of the disclosure or from the scope of the appended claims. Although the present disclosure has been described with respect to specific details, it is not intended that such details should be regarded as limitations on the scope of the disclosure, except to the extent that they are included in the accompanying claims.

What is claimed is:

1. A method for evaluating a gravel pack, frac-pack or cement in a wellbore, comprising:
   pumping a first non-radioactive tracer into the wellbore;
   pumping a second non-radioactive tracer, wherein the second tracer is different than the first tracer;
   obtaining a first set of data utilizing a downhole tool in the wellbore at a depth interval without the first tracer or the second tracer;
   obtaining a second set of data after the first and second tracers are pumped into the wellbore; and
   comparing the first set of data and the second set of data to identify, distinguish, or quantify of the first tracer in the wellbore or a filling volume of the second tracer in the wellbore.

2. The method of claim 1, wherein comparing the first set of data and the second set of data identifies, distinguishes, or quantifies a filling volume of the first tracer in the wellbore and a filling volume of the second tracer in the wellbore.

3. The method of claim 1, wherein the first set of data comprises a borehole sigma along a blank pipe of the wellbore.

4. The method of claim 1, wherein the first set of data comprises a borehole sigma along a blank frac-pack assembly.

5. The method of claim 1, wherein the first set of data is a data log obtained before the pumping of the first tracer and the second tracer.

6. The method of claim 5, wherein the second set of data is a data log comprising a plurality of log columns.

7. The method of claim 6, wherein the plurality of log columns comprises a plurality of depths where measurements of the logging tool are recorded.

8. The method of claim 6, wherein the plurality of log columns comprises a total filling volume of the first tracer and the second tracer, a filling volume of the first tracer, and a filling volume of the second tracer.

9. The method of claim 1, wherein the second set of data is a data log comprising a detector gamma ray count rate in a time window of about 0 us to about 30 us during or after neutron bursts.

10. The method of claim 9, wherein the detector gamma ray count rate during the time window substantially or completely does not change for the first tracer and the detector gamma ray count rate during the time window increases.

11. The method of claim 1, wherein the second set of data is a data log comprising a detector gamma ray count rate in a time window of about 40 us to about 70 us after neutron bursts.

12. The method of claim 1, wherein the second set of data comprises a ratio of (1) a detector gamma ray count rate in a first time window during or after neutron bursts to (2) a detector gamma ray count rate in a second time window during or after neutron bursts.

13. The method of claim 12, wherein the first time window is about 0 μs to about 30 μs.

14. The method of claim 13, wherein the second time window is about 40 μs to about 70 μs.

15. The method of claim 1, wherein comparing the first set of data and the second set of data comprises comparing the first set of data to the second set of data to determine a filling volume of the first tracer in the wellbore or a filling volume of the second tracer in the wellbore.

16. The method of claim 1, wherein comparing the first set of data and the second set of data comprises comparing the first set of data to the second set of data a total volume of the first tracer and the second tracer.

17. The method of claim 16, wherein comparing the first set of data and the second set of data comprises subtracting a filling volume of the first tracer from the total volume to obtain a filling volume of the second tracer.

18. The method of claim 17, wherein the filling volume of the first tracer is determined by a change in gamma rays during neutron bursts, wherein the first tracer comprises gadolinium.

19. The method of claim 1, further comprising calibrating a model in response to the comparison of the first set of data and the second set of data.

20. The method of claim 19, wherein the model is selected from the group consisting of a fracture model, a frac-pack model, a gravel pack model, a cement model, or combinations thereof.

21. A method for evaluating a gravel pack, frac-pack or cement in a wellbore, comprising:
pumping a first non-radioactive tracer into the wellbore, wherein a data set related to a non-radioactive tracer is not obtained before pumping the first non-radioactive tracer into the wellbore;
obtaining a first set of data utilizing a downhole tool in the wellbore at a depth interval without the first tracer, wherein obtaining the first set of data is performed after pumping the first non-radioactive tracer into the wellbore;
obtaining a second set of data after the first tracer is pumped into the wellbore, wherein obtaining the second set of data is performed after pumping the first non-radioactive tracer into the wellbore; and
comparing the first set of data and the second set of data to identify, distinguish, or quantify the first tracer in the wellbore.

* * * * *